United States Patent [19]

Shindarov et al.

[11] 3,846,491
[45] Nov. 5, 1974

[54] DERIVATIVES OF N-2-HYDROXYPHENYLTHIOUREA

[75] Inventors: Lubomir Mihaylov Shindarov; Angel Simenov Galabov; Dimitar Simov Antonov; Nadejda Atanasova Neykova; Krum Atanasov Davidkov; Vesselina Dimitrova Vassileva; Veneta Borisova Kalcheva; Dushka Staneva Stoycheva, all of Sofia, Bulgaria

[73] Assignee: Medizinska Akademia, Sofia, Bulgaria

[22] Filed: Aug. 23, 1972

[21] Appl. No.: 282,917

[30] Foreign Application Priority Data
Aug. 23, 1971  Bulgaria.................................. 17223

[52] U.S. Cl.......... 260/552 R, 260/553 A, 424/322
[51] Int. Cl......................................... C07c 157/08
[58] Field of Search..................... 260/552 R, 553 A

[56] References Cited
UNITED STATES PATENTS
2,795,610   6/1957   Gerjovich ....................... 260/553 A OTHER PUBLICATIONS
Simov, Chemical Abstracts, Vol. 74, p. 438, (item 99167x), (1971).
Herrmann, Proc. Soc. Exp. Biol., Vol. 107, pp. 142–145, (1961).

Primary Examiner—Leon Zitver
Assistant Examiner—Michael W. Glynn
Attorney, Agent, or Firm—Armstrong, Nikaido & Wegner

[57]              ABSTRACT

N-2-hydroxyphenylthiourea derivatives are disclosed, possessing antiviral activity against foot and month disease in mice and guinea pigs and Coxsackie A and B infections in newborn mice.

2 Claims, No Drawings

DERIVATIVES OF N-2-HYDROXYPHENYLTHIOUREA

BACKGROUND OF THE INVENTION

In view of the fact that treatment of viral infection diseases represents a serious problem in modern medicine, research work for discovering efficient preparations for ethiotropic treatment having inhibiting effect on the virus growth is of great importance for modern virology.

Among the numerous compounds studied in the prior art, only some are known to possess antiviral activity. Izatine-β-thiosemicarbazone derivatives have been proposed for smallpox prophylaxis, and adamantanamino and flumidine have been used for influenza prophylaxis. 5-Iodo-2'-desoxyuridine has been used for treatment of some cases of herpes keratitis.

Guanidine and 2-(α-hydroxyphenyl)-benzoimidazole are known to inhibit in vitro the multiplication of most picorna viruses, while having no effect at all when applied in vivo. This is due to the quick formation of mutants stable to the action of these substances.

It is an object of the invention to provide new substances showing high activity for certain picornaviruses.

SUMMARY OF THE INVENTION

In accordance with the invention, there are provided compounds of the formula

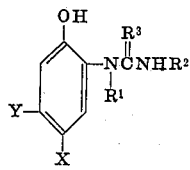

(I)

wherein
- $R^1$ is methyl, ethyl, allyl, propyl, butyl or a benzyl group;
- $R^2$ is methyl, propyl, butyl, benzyl or a cyclohexyl group;
- $R^3$ is sulphur or oxygen;
- X is hydrogen, chlorine or sulphonamide group;
- Y is hydrogen or bromine.

DETAILED DESCRIPTION OF THE INVENTION

The compounds (I) have been found to possess antiviral activity for certain picornaviruses (polio, Coxsackie A and B, ECHO and FMD virus). The activity is expressed in marked inhibiting properties on the virus growth in cell cultures (90 – 99 percent inhibition of the virus yield). The compounds (I) also prevent or retard the course of experimental FMD (foot-and-mouth disease) in mice and guinea pigs, and prevent Coxsackie A and B infections in newborn mice. In most of the cases the selectivity index values are comparatively high (>4-5).

The compounds (I) are prepared under relatively mild conditions from the reaction of a heterocyclic compound of the formula

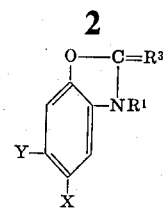

(II)

with an amine of the formula $$H_2N - R^2$$

(III)

wherein $R_1$, $R_2$, $R_3$, X and Y are as defined above.

The compounds (I) can be successively applied as virostatics against the aforementioned picornaviruses. Their antiviral properties were established by carrying out in vitro tests on cell cultures and by carrying out in vivo tests on experimental Coxsackie infections and infections caused by the FMD virus, by the following methods:

METHOD I

The plaque-inhibition test of Herrmann, the compounds being used in maximum subtoxic concentration.

METHOD II

One-step virus growth cycle experiments in which the concentration of the tested substances equals the maximum subtoxic one.

The investigations with the poliovirus 1, coxsackievirus B1 and echovirus 19 were carried out on cell cultures FL (in some of the cases poliovirus cells KB were used), while calf kidney primary cultures were used for the FMD virus.

The maximum subtoxic concentration of the compounds can be determined by the use of graphs which show the multiplication of a given cell culture in the presence of the respective active compound which is followed until a stationary phase is reached.

The activity of the compounds was tested in cases of experimental coxsackievirus A6, A7, B1 and B3 infections on newborn mice, and in cases of FMD virus infections on newborn mice and guinea pigs. In the cases of viral infections on newborn mice the percentage of lethality in the treated animal groups compared with the placebo group is determined, as well as the alternative response time ($ET_{50}$ - Link, 1969). When carrying out tests on guinea pigs by inoculating them with FMD virus, the effect shown by the compounds of the present invention is measured on the base of the percentage of animals in the treated animal groups showing generalized infection, compared with the placebo group.

The invention is further illustrated by the following nonlimitive examples:

EXAMPLE 1

N-methyl-N-(2-hydroxy-5-chlorophenyl)-N'-benzylthiourea 1.0 g. of N-methyl-5-chlorobenzoxazole-thione and 1 cc. of benzylamine were heated at 80°C. After cooling the reaction mixture was dissolved in ether and then consecutively extracted with 6 percent hydrochloric acid and 5 percent solution of sodium base. The alkaline extract was then neutralized, a white crystalline mass falling as precipitate. Yield 1.35 g (88 percent of the theoretical). The product was further recrystallized in alcohol solution, m.p. of the so purified substance being 137°–138°C.

Analysis, Calc. for $C_{15}H_{15}ClN_2SO$: C, 58.81; H, 4.90; H, 9.15
Found: C, 58.55; H, 4.66; N, 9.43;

EXAMPLES 2–9

By following the procedures of Example I, substituting an equimolar amount of the heterocyclic compound (II) and amine (III) for the N-methyl-5-chlorobenzoxazole-thione and benzylamine, respectively, antiviral compounds (I) are produced:

was neutralized and the formed precipitate filtered. After dissolving in 10 percent sodium base the product was precipitated with dilute hydroxhloric acid, the so purified substance weighing 1.85 g. (72 percent of the theoretical). The product was further recrystallized from alcohol solution. M.p. 135°–136°C.

Analysis, Calc. for $C_{17}H_{20}N_2O_2$: C, 71.83; H. 7.04; N, 9.85
Found: C, 71.82; H, 7.15; N, 9.71

EXAMPLES 11–16

Substitution of equimolar amounts of heterocyclic compound (II) and amine (III) for N-benzylbenzoxazolone and propylamine, respectively in the procedure of Example 10 yields the following results:

| Ex. | Heterocyclic Compound(II) | Amine (III) | M.P.(°C) | Empirical formula | Analysis Found | Calc. |
|---|---|---|---|---|---|---|
| 2 | N-methyl-6-bromo-benzoxazolethione | benzyl-amine | 126–128 | $C_{15}H_{15}BrN_2OS$ | C,51.27<br>N, 8.22 | C,51.43<br>N, 8.00 |
| 3 | N-methyl-6-bromo-benzoxazolethione | propyl-amine | 106–107.5 | $C_{17}H_{15}BrN_2OS$ | N, 8.97 | N, 9.24 |
| 4 | N-ethyl-benz-oxazolethione | benzyl-amine | 146–147 | $C_{16}H_{18}N_2OS$ | C,67.18<br>H, 5.97<br>N, 9.63 | C,67.13<br>H, 6.29<br>N, 9.79 |
| 5 | N-allyl-benzox-azolethione | benzyl-amine | 142–145 | $C_{17}H_{16}N_2OS$ | C,68.28<br>H, 6.69<br>N, 9.51 | C,68.45<br>H, 6.08<br>N, 9.38 |
| 6 | N-propyl-benz-oxazolethione | benzene-amine | 145–146 | $C_{17}H_{20}N_2OS$ | C,68.26<br>H, 6.65<br>N, 9.31 | C,68.00<br>H, 6.66<br>N, 9.33 |
| 7 | N-propyl-benz-oxazolethione | propyl-amine | 128–129 | $C_{13}H_{20}N_2OS$ | C,61.98<br>H, 7.29<br>N,11.36 | C,61.90<br>H, 7.95<br>N,11.11 |
| 8 | N-propyl-benz-oxazolethione | butyl-amine | 119–121 | $C_{14}H_{22}N_2OS$ | C,63.41<br>H, 8.24<br>N,10.85 | C,63.15<br>H, 8.27<br>N,10.52 |
| 9 | N-propyl-benz-oxazolethione | cyclo-hexyl-amine | 157–158 | $C_{16}H_{24}N_2OS$ | C,66.05<br>H, 8.78<br>N, 9.64 | C,65.74<br>H, 8.21<br>N, 9.58 |

| Ex. | Heterocyclic Compound(II) | Amine (III) | M.P.(°C) | Empirical Formula | Analysis Found | Calc. |
|---|---|---|---|---|---|---|
| 11 | N-benzyl-benz-oxazolone | methyl-amine | 152–153 | $C_{15}H_{16}N_2O_2$ | C,70.01<br>N,10.83 | C,70.31<br>N,10.93 |
| 12 | N-benzyl-5-chloro-benzoxa-zolone | methyl-amine | 148–149 | $C_{15}H_{15}ClN_2O_2$ | C,62.17<br>H, 5.96<br>N, 9.43 | C,62.06<br>H, 5.16<br>N, 9.65 |
| 13 | N-benzyl-5-chloro-benzoxazolone | propyl-amine | 124.5–126 | $C_{17}H_{19}ClN_2O_2$ | C,64.30<br>H, 6.17<br>N, 8.71 | C,64.15<br>H, 5.97<br>N, 8.80 |
| 14 | N-benzyl-6-bromo-benzoxazolone | propyl-amine | 129–131 | $C_{17}H_{19}BrN_2O_2$ | C,56.43<br>H, 5.67<br>N, 7.43 | C,56.19<br>H, 5.23<br>N, 7.43 |
| 15 | N-benzyl-benzoxazolone | benzyl-amine | 126–127.5 | $C_{21}H_{20}N_2O_2$ | C,76.03<br>76.00<br>H, 6.34<br>6.28 | C,75.90<br>H, 6.02 |
| 16 | N-benzyl-5-chloro-benzoxazolone | benzyl-amine | 139.5–141 | $C_{21}H_{19}ClN_2O_2$ | C,69.16<br>H, 5.21<br>N, 7.92 | C,68.85<br>H, 5.19<br>N, 7.65 |

EXAMPLE 10

N-benzyl-N-(2-hydroxyphenyl)-N'-propylurea
2.0 g. of N-benzylbenzoxasolane and 10.0 cc. of 50 percent aqueous solution of propylamine were boiled together for 7 hours. After cooling the reaction mixture

EXAMPLE 17

Following the test procedures indicated in the table, representative compounds were tested with the results indcated below.

EFFECTS ON PLAQUE FORMATION AND MULTIPLICATION OF PICORNAVIRUSES OF COMPOUNDS USED IN MAXIMAL SUBTOXIC CONCENTRATION

| Virus | Active compound | Plaque-formations (plaque-inhibition test) | | | Virus multiplication (one-step virus growth cycle test) | |
|---|---|---|---|---|---|---|
| | | Diameter (mm.) | PFU/ meters | Percent of reduction | PFU/ ml. | Percent of inhibition |
| Polio 1 | 2-OH, 4-SO$_2$NH$_2$-C$_6$H$_3$–N(CH$_3$)–CSNHCH$_2$C$_6$H$_5$ 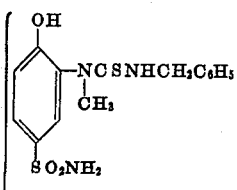 | -------- | -------- | -------- | 1.1×10$^8$ | 68.5 |
|  | 2-OH, 5-Cl-C$_6$H$_3$–N(CH$_3$)–CSNHCH$_2$C$_6$H$_5$ 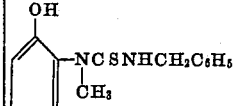 | 2.0 | 108, 103 | 31.3 | 1.6×10$^7$ | 95.8 |
|  | 2-HO-C$_6$H$_4$–N(C$_3$H$_7$)–CSNHCH$_2$C$_6$H$_5$  | 1.5 | 116, 108 | 30.0 | 6.9×10$^6$ | 98.2 |
|  | 2-HO-C$_6$H$_4$–N(CH$_2$CH=CH$_2$)–CSNHCH$_2$C$_6$H$_5$ 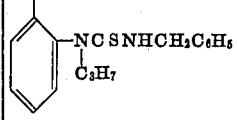 | -------- | -------- | -------- | 2.6×10$^7$ | 93.3 |
|  | Control sample | 4.0 | 160, 160 | -------- | 3.9×10$^6$ | -------- |
| Coxsackie B$_1$ | 2-OH, 4-SO$_2$NH$_2$-C$_6$H$_3$–N(CH$_3$)–CSNHCH$_2$C$_6$H$_5$ 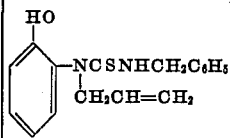 | 1.2 | 72, 74 | 41.1 | 3.4×10$^6$ | 92.1 |
|  | 2-HO-C$_6$H$_4$–N(C$_3$H$_7$)–CSNHCH$_2$C$_6$H$_5$ 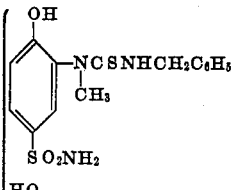 | 1.0 | 75, 77 | 38.7 | 5.4×10$^6$ | 87.5 |
|  | 2-OH, 4-Br-C$_6$H$_3$–N(CH$_3$)–CSNHCH$_2$C$_6$H$_5$ 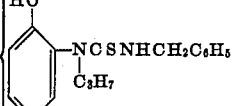 | -------- | -------- | -------- | 4.3×10$^6$ | 90.0 |
|  | Control sample | 3.6 | 128, 120 | -------- | 4.3×10$^7$ | -------- |
| ECHO 19 | 2-HO-C$_6$H$_4$–N(C$_3$H$_7$)–CSNHCH$_2$C$_6$H$_5$ 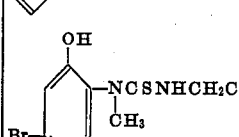 | 2.3 | 18, 20, 22 | 39.4 | 4.1×10$^7$ | 70.7 |
|  | 2-OH, 4-Br-C$_6$H$_3$–N(CH$_3$)–CSNHCH$_2$C$_6$H$_5$ 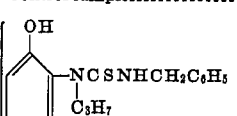 | -------- | -------- | -------- | 4.0×10$^7$ | 71.6 |
|  | Control sample | 3.5 | 32, 33, 34 | -------- | 1.4×10$^8$ | -------- |
| FMD | 2-OH, 4-Br-C$_6$H$_3$–N(CH$_2$C$_6$H$_5$)–CONHCH$_2$C$_6$H$_5$ 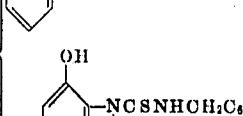 | -------- | -------- | -------- | 3.1×10$^4$ | 98.8 |
|  | Control sample | -------- | -------- | -------- | 2.6×10$^6$ | -------- |

In cases of experimental infection in newborn mice caused by coxsackievirus B1, B3, A6 and A7 (5-10 $LD_{50}$ virus dose) a daily application of N-methyl-N-(2-hydroxyphenyl-4-sulphonamide)-N'-benzylthiourea and N-propyl-N-(2-hydroxyphenyl)-N'-benzylthiourea by subcutaneous administration results in retarding the course of the infection generally by 2–3 days ($ET_{50}$) and in reduction of the number of death cases. $ED_{50}$ is 86.6 mg/kg when subcutaneously applied once daily for a period starting 48 hours before viral inoculation and throughout the whole course of the infection.

In cases of FMD infection on newborn mice application of N-benzyl-N-(2-hydroxyphenyl)-N'-benzylurea is daily doses of 86.6 mg/kg (acute toxicity $LD_{50}=200.0$ mg/kg) according to the above said pattern protects from ailing (encephalitic) 83.4–100 percent of the treated animals compared with 63.7–90 percent lothality in the placebo group. In cases of infecting guinea pigs with the FMD virus this substance when administered in daily doses of 40 mg/kg for a period starting 48 hours before the viral inoculation and ending on the 5th day after, reduces the number of disease cases 2 to 3.5 times as compared with the placebo group (significance level less than 0.01).

Investigation of acute toxicity for mice and rats of N-propyl-N-(2-hydroxyphenyl)-N'-benzylthiourea showed the following $LD_{50}$ values (calculated by the Pershin method) for mice-283.5 mg-kg (intraperitoneally) and 733.5 mg-kg (subcutaneously); for rats - $\geq 600.0$ mg/kg (intraperitoneally) Selectivity index ($LD_{50}/ED_{50}$) is 8.5.

When pregnant female rats are intraporitoneally treated with N-propyl-N-(2-hydroxyphenyl)-N'-benzylthiourea (daily doses of 50 mg/kg) no teratogenic effects are observed.

What is claimed is:
1. N-methyl-N-(2-hydroxy-5-chlorophenyl)-N'-benzylthiourea.
2. N-methyl-N-(2-hydroxy-6-bromophenyl)-N'-propylthiourea.

* * * * *